United States Patent [19]

Braunling

[11] Patent Number: 4,653,035
[45] Date of Patent: Mar. 24, 1987

[54] SELECTIVE PROXIMITY DETECTOR

[75] Inventor: Russell D. Braunling, Eden Prairie, Minn.

[73] Assignee: Honeywell Inc., Minneapolis, Minn.

[21] Appl. No.: 753,733

[22] Filed: Jul. 10, 1985

[51] Int. Cl.[4] ............................................. H04B 1/00
[52] U.S. Cl. .................................... 367/136; 102/215; 102/427; 181/401
[58] Field of Search ................ 367/136, 135; 102/215, 102/427, 211; 181/401

[56] References Cited

U.S. PATENT DOCUMENTS 3,585,581  6/1971  Aune et al. ............................ 367/136
4,468,763  8/1984  Braunling et al. .................... 367/136

Primary Examiner—Thomas H. Tarcza
Assistant Examiner—Daniel T. Pihulic
Attorney, Agent, or Firm—Roger W. Jensen

[57] ABSTRACT

Geophone apparatus for receiving seismic signals due to an approaching vehicle, and giving an output when the signals are those characteristic of a heavy vehicle.

4 Claims, 2 Drawing Figures 4,653,035

SELECTIVE PROXIMITY DETECTOR

The Government has rights in this invention pursuant to Contract No. F08635-79-C-0178, awarded by the Department of the Air force.

FIELD OF THE INVENTION

This invention relates to the field of armaments, and particularly to geophone apparatus for use with land mines.

Occasion sometimes arises to interdict the movement of vehicles in an outdoor area. This may be done by distributing mines throughout the area which function upon firing to disable a vehicle if within an effective range from the mine. Mines are accordingly equipped with apparatus for detecting the approach of targets within range thereof.

It is desirable that such mines be not readily perceptible, and thus avoidable by approaching vehicles, so that passive vehicle detecting arrangments are preferred. In this respect, seismic devices, supported on or buried in the ground and responsive to vibrations in the earth caused by the vehicles, have been found quite satisfactory, as is taught in U.S. Pat. No. 4,468,763. A difficulty arises, however, since in that arrangement the seismic signal due to a light vehicle is not readily distinguishable from the seismic signal due to a heavier vehicle. Some land mines are known to be effective against light vehicles, such as jeeps, but to be relatively ineffective against heavier vehicles, such as armored tanks. It is inefficient to fire a mine upon the mere presence of an undifferentiated vehicle, against which the mine might well be ineffectual, since these mines are expensive, high-technology devices.

A vehicle moving along the ground acts as a source of seismic vibrations or "Rayleigh waves", in distinguishable frequency bands. Waves having frequencies in a higher band are more subject to attenuation.

The present invention comprises seismically responsive apparatus for detecting the presence of moving vehicles, distinguishing vibrations due to heavy vehicles as sources, and supplying a signal for inhibiting further apparatus operation if the source is determined to be a heavy vehicle.

Various advantages and features of novelty which characterize the invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there is illustrated and described a preferred embodiment of the invention.

DESCRIPTION OF THE PREFERRED EMBODIMENT

Figure 1:
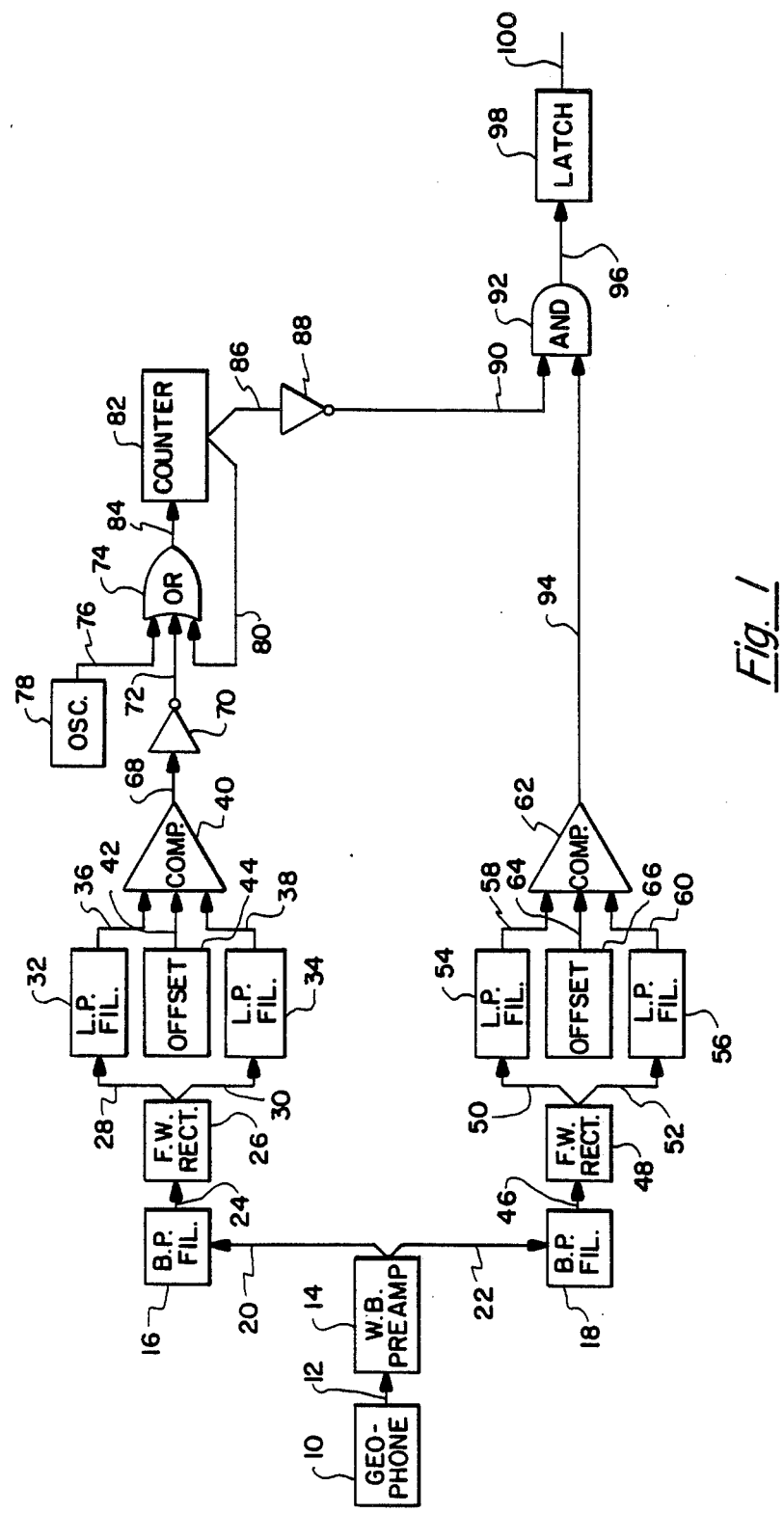
FIG. 1 comprises a schematic showing of apparatus making up the invention.

Referring now to FIG. 1, a geophone 10 is shown to supply a signal 12 to a wide band preamplifier 14, which energizes band pass filters 16 and 18 with signals 20 and 22. Filter 16 preferably has a pass band of about 20 Hertz to 150 Hertz, and filter 18 preferably has a pass band of about 1.5 Hertz to 8.5 Hertz.

The output 24 from filter 16 is fed to a full wave rectifier 26 which supplies inputs 28 and 30 respectively to a first low pass filter 32, acting as a short term averager, and a second low pass filter 34, acting as a long term averager. Filter 32 preferably has a time constant of about 8 seconds, and filter 34 preferably has a time constant of about 6 seconds. The outputs 36 and 38 respectively of filters 32 and 34 are supplied to a comparator 40, together with the output 42 of an offset device 44.

The output 46 from filter 18 is fed to a full wave rectifier 48 which supplies inputs 50 and 52 respectively to a first low pass filter 54, acting as a short term averager, and a second low pass filter 56, acting as a long term averager. Filter 54 preferably has a time constant of about 4 seconds, and filter 56 preferably has a time constant of about 12 seconds. The outputs 58 and 60 respectively of filters 54 and 56 are supplied to a comparator 62, together with the output 64 of an offset device 66.

The output 68 of comparator 40 is fed through an inverter 70 to comprise a first input 72 to an OR circuit 74, having a second input 76 from an oscillator 78 and a feedback input 80 comprising the output of a counter 82 energized at 84 from OR circuit 74.

The output of counter 82 is also supplied at 86 to an inverter 88 which supplies a first input 90 to an AND circuit 92. A second input 94 to AND circuit 92 is supplied by comparator 62, and the output 96 of AND circuit 92 is supplied through a latch 98 to constitute the desired indication 100 of the apparatus.

OPERATION

The operation of the invention can best be understood from the following explanation. When a geophone is coupled to the ground, there is always a signal at a background level. When such a signal is rectified and sent to averaging circuits such as circuits 32 and 34, the outputs of these circuits continue generally at constant levels. By suitably selecting the components of offset apparatus such as 44, the inputs to comparator 40 may be so set that in the absence of signals from a vehicle the long term average 38 is always greater than the short term average 36, and the comparator provides no output.

When a vehicle approaches, the higher frequency signal supplied by rectifier 26 increases, so that the outputs 36 and 38 both also increase. However, because of the difference in time constants in circuits 32 and 34, the output of the former can increase more rapidly than the output of the latter, until the relation of the signals to comparator 40 reverses, and the comparator now gives an output at 68.

When a vehicle approaches, the lower frequency signal supplied by rectifier 48 also increases so that the outputs 58 and 60 both also increase. However, because of the difference in time constants in circuits 54 and 56, the output of the former can increase more rapidly than the output of the latter, until the relation of the signals to comparator 62 reverses, and the comparator now gives an output at 94.

Figure 2:
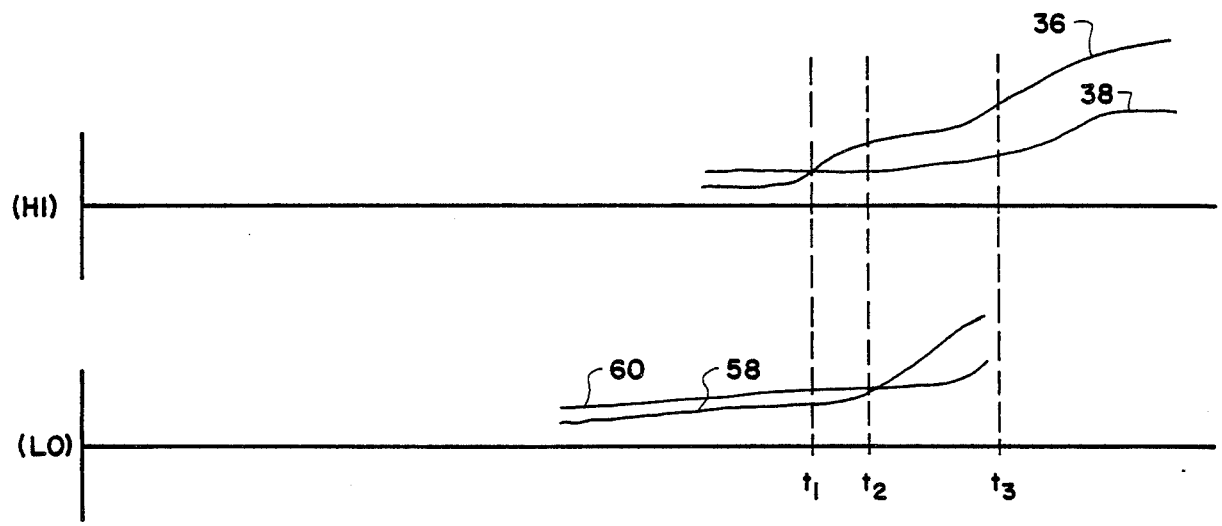
FIG. 2 depicts certain seismic energy relations.

The changes in output of rectifiers 26 and 48 are not simultaneous, as is suggested in FIG. 2.

The normal condition of the apparatus, in the absence of any vehicle signals, is as follows, stated in computer logic terminology.

Offset 42 is set so that output 68 of comparator 40 is LOW and output 72 is HIGH, preventing oscillator 78 from affecting OR circuit 74 whose output 84 is HIGH. Outputs 80 and 86 of counter 82 are LOW, and output 90 is HIGH. However, offset 64 is set so that output 94 of comparator 62 is LOW, output 96 of AND circuit 92 is LOW, latch 98 is not energized, and output 100 is LOW.

Refer now to FIG. 2, which shows the relation of outputs 36, 38, 58, and 60 upon the approach of a heavy vehicle. The setting of offset 42 is such that when high frequency vibrations are detected, output 36 becomes greater than output 38 at a time $t_1$. Output 68 becomes HIGH and output 72 becomes LOW, enabling oscillator 76 to pulse OR circuit 74 to supply pulses at 84 to counter 82. Until a predetermined count is reached, outputs 80 and 86 do not change, however, and output 90 remains HIGH.

The setting of offset 64 is such that when low frequency vibrations are detected, output 58 becomes greater than output 60, at a time $t_2$. Output 94 becomes HIGH, enabling AND circuit 92, so that output 96 becomes HIGH, output 100 becomes HIGH to indicate the presence of a heavy vehicle, and latch 98 operates to retain the signal at 100.

After a predetermined count is reached, at a time $t_3$, counter outputs 80 and 86 become HIGH. The former disables OR circuit 74 from actuation by oscillator 78, and the latter changes output 90 to LOW, but no change at output 100 occurs because of latch 98.

It has been determined that, for heavy vehicles, time $t_2$ may occur before time $t_1$, but never occurs after a time $t_3$ which is later than time $t_1$ by about 4.3 seconds. If counter 82 gives its output 86 before comparator 62 gives its output, input 90 to AND circuit 92 changes to LOW, and a subsequent second input 94 is incapable of actuating latch 98 or giving output 100. The appearance of output 100 is thus an indication of the presence of a heavy vehicle, and may be used to inhibit the operation of a mine or for any other desired purpose.

Numerous characteristics and advantages of the invention have been set forth in the foregoing description, together with details of the structure and function of the invention, and the novel features thereof are pointed out in the appended claims. The disclosure, however, is illustrative only, and changes may be made in detail, especially in matters of shape, size, and arrangement of parts, within the principle of the invention, to the full extent indicated by the broad general meaning of the terms in which the appended claims are expressed.

The embodiments of the invention in which an exclusive property or right is claimed are defined as follows:

1. Apparatus for detecting the approach toward a reference point on the ground of a heavy vehicle traveling on the ground, said apparatus comprising in combination:
   (a) single geophone means mounted and adapted to respond to vibrations in the ground and to provide an output indicative of vibrations sensed thereby;
   (b) first means including high-pass means connected to receive the output of said geophone means, said first means further including means for providing an output when the long-term average of high frequency vibrations reaches a predetermined relation to the short-term average thereof;
   (c) second means including low pass means connected to receive the output of said geophone means, said second means further including means for providing an output when the long-term average of low-frequency vibrations reaches a predetermined relation to the short-term average thereof;
   (d) an oscillator means having an output for providing pulses;
   (e) OR circuit means having three inputs and an output means;
   (f) counter means having an input and an output;
   (g) AND circuit means having a pair of inputs and an output;
   (h) latch means having an input and an output;
   (i) means including inverter means for connecting the output of said first means to one of said inputs of said OR circuit means, said other inputs of said OR circuit means being connected to receive: (1) the output of said oscillator means, and (2) an output from said counter means, and said OR circuit output means being connected to the input of said counter means;
   (j) means including inverter means for connecting the output of said counter means to one of the input means of said AND circuit means;
   (k) means connecting the output of said second means to the other of the input means of said AND circuit means; and
   (l) means connecting the output of said AND circuit means to the input of said latch means; whereby said apparatus functions as follows:
      (1) in the absence of any vehicle signals (i) said OR circuit means is inhibited by said first means, thus preventing pulses from said oscillator means from being applied to said counter means so that the output of said counter means is low, and (ii) the outputs of said second means, said AND circuit means and said latch means are low, and
      (2) upon the approach of a heavy vehicle (i) said first means (in response to high frequency vibrations) enables said OR circuit means to pass said pulses to said counter means to thereby, after a predetermined time interval, cause a high output from said counter means and (ii) said second means (in response to low frequency vibrations) operates as aforesaid to provide an output and thereby enable said AND circuit means to thereby actuate said latch means to thereby have a high signal at the output thereof so as to signal the presence of a heavy vehicle, provided, however, that if said high output from said counter means occurs prior to the production of the output signal from said second means, then a subsequent output signal from said second means will be ineffective to actuate said latch means.

2. Apparatus of claim 1 further characterized by said first means having a band pass of between 20 and 150 Hertz.

3. Apparatus of claim 1 further characterized by said second means having a band pass of between 1.5 and 8.5 Hertz.

4. Apparatus of claim 1 further characterized by said predetermined time interval being approximately 4.3 seconds.

* * * * *